United States Patent [19]
Bonder et al.

[11] Patent Number: 6,078,265
[45] Date of Patent: Jun. 20, 2000

[54] FINGERPRINT IDENTIFICATION SECURITY SYSTEM

[75] Inventors: Ronné Bonder, New York, N.Y.; Albert J. Fisher, Jr., Mesquite, Tex.

[73] Assignee: Nettel Technologies, Inc., Richardson, Tex.

[21] Appl. No.: 09/021,759

[22] Filed: Feb. 11, 1998

[51] Int. Cl.[7] .................................................. H04Q 1/00
[52] U.S. Cl. ...................... 340/825.31; 382/124; 70/289
[58] Field of Search ......................... 340/825.31, 825.34; 382/124; 70/289

[56] References Cited

U.S. PATENT DOCUMENTS

| | | |
|---|---|---|
| 2,936,607 | 5/1960 | Nielsen . |
| 3,201,961 | 8/1965 | Williams et al. . |
| 3,660,624 | 5/1972 | Bell . |
| 4,192,400 | 3/1980 | McEwan . |
| 4,213,038 | 7/1980 | Silverman ..................... 340/825.34 |
| 4,240,516 | 12/1980 | Henderson ..................... 340/825.34 |
| 4,438,426 | 3/1984 | Adkins ........................... 340/825.31 |
| 4,789,859 | 12/1988 | Clarkson ........................ 340/825.31 |
| 4,800,590 | 1/1989 | Vaughan ........................ 340/825.31 |
| 4,967,305 | 10/1990 | Murrer ........................... 340/340 |
| 5,054,090 | 10/1991 | Knight et al. . |
| 5,055,658 | 10/1991 | Cockburn ....................... 382/124 |
| 5,070,714 | 12/1991 | Bedford ......................... 70/289 |
| 5,138,468 | 8/1992 | Barbanell . |
| 5,204,663 | 4/1993 | Lee ................................. 340/825.34 |
| 5,245,329 | 9/1993 | Gokcebay . |
| 5,287,098 | 2/1994 | Janssen . |
| 5,337,043 | 8/1994 | Gokcebay . |
| 5,448,659 | 9/1995 | Tsutsui et al. . |
| 5,541,994 | 7/1996 | Tomko et al. . |
| 5,603,179 | 2/1997 | Adams . |
| 5,623,552 | 4/1997 | Lane . |
| 5,633,932 | 5/1997 | Davis et al. . |
| 5,633,947 | 5/1997 | Sibbald . |
| 5,661,451 | 8/1997 | Pollag . |
| 5,668,874 | 9/1997 | Kristol et al. . |
| 5,799,092 | 8/1998 | Kristol et al. . |

*Primary Examiner*—Brian Zimmerman
*Attorney, Agent, or Firm*—Scully, Scott, Murphy & Presser

[57] ABSTRACT

A key-lock operated security system utilizing a fingerprint of an authorized user to control access to the security system, such as the ignition system of an automobile. An intelligent key has a fingerprint scanning chip embedded in the surface thereof, and further has a microcontroller, a memory and electrical contacts to provide an intelligent key capable of scanning and distinguishing between different fingerprints. The scanning chip is interfaced to the microcontroller which controls the operation thereof and reads data from the scanning chip, to scan and correlate the minutia patterns of an individual fingerprint against one or more patterns of fingerprints of authorized users of the security system stored within the memory. A lock has electrical contacts which contact the electrical contacts on the intelligent key when the intelligent key is inserted therein, to provide electrical power to the circuitry of the intelligent key, and to enable a data signal to be transmitted from the intelligent key through the electrical contacts to a key-lock controller, which in response thereto controls security functions of the security system, such as the operation and control of the ignition system of an automobile.

23 Claims, 6 Drawing Sheets

FINGERPRINT IDENTIFICATION SECURITY SYSTEM

BACKGROUND OF THE INVENTION

1. Field of the Invention

The present invention relates generally to a fingerprint identification security system, and more particularly pertains to a fingerprint identification security system which is implemented in association with a key operated automobile ignition switch security system.

2. Discussion of the Prior Art

Traditional methods of turning on the ignition system in an automobile have relied upon a key operated, rotating cylinder lock ignition switch in which a key has an encoded pattern cut into an edge thereof. A mechanical rotating tumbler locking mechanism is coupled to an electrical ignition switch, and effectively decodes the key and operates the ignition switch. Later advancements have included a series of jumper connections embedded in the key which in effect, act as a programming mechanism for the key such as in U.S. Pat. No. 3,660,624, or the use of magnetic data memory strips to encode user data as in U.S. Pat. No. 5,337,043. All of these locking mechanisms have shared a common problem; they can be relatively easily bypassed and defeated, particularly by professional thieves.

Two common methods of automotive theft rely upon speed, and include shorting together the wires connected to the ignition switch or breaking apart the ignition lock assembly to thereby defeat its integrity, and have not changed much over time despite many advances in technology. The risk to a criminal of being caught increases in proportion to the time required to steal a vehicle. A third common method of automotive theft is simply due to the carelessness of an owner inadvertently leaving the keys in the ignition.

Higher levels of security for locking mechanisms have been achieved by mechanical or optical scanners which correlate some unique biometric parameter of an individual, such as a fingerprint. One such scanning device is described in U.S. Pat. No. 2,936,607. Scanners of this type, however, have been much too large and/or expensive to embed in a typical automotive ignition key, and have only been used effectively in large commercial or military applications.

SUMMARY OF THE INVENTION

Accordingly, it is a primary object of the present invention to provide a fingerprint identification security system which embeds a fingerprint scanning device or chip into an intelligent key by utilizing a scanner chip which is available commercially from Verdicom, Inc., 2338 Walsh Ave., Santa Clara, Calif. 95051, and which utilizes the technological approaches disclosed in U.S. Pat. No. 5,668,874, and also in U.S. Pat. No. 5,799,092, assigned to Lucent Technologies, Inc. The present invention also embeds a microcontroller and associated circuitry in the key, thereby creating an intelligent key capable of scanning and differentiating between different human fingerprints, which present a very unique biometric trait for each individual.

A single intelligent key can store data on fingerprints for multiple authorized users, differentiate between authorized and unauthorized users, and store the fingerprint of an unauthorized attempted user for law enforcement purposes to provide a previously unattainable level of security for the automobile. When such an intelligent key is connected to a key-lock controller through an electromechanical locking mechanism, several of the common approaches to auto theft are eliminated. The connections to the ignition switch are provided by data paths and logic lines; therefore, shorting the ignition wires will not jump or bypass the ignition starter system. Likewise, breaking the lock mechanism and rotating the ignition switch will also not provide the proper data signal to the key-lock controller. Moreover, if the key is inadvertently left in the ignition switch, the security system will not recognize an unauthorized fingerprint of a potential thief, and will not enable the automobile to be started. The optional ability to differentiate between authorized users can further be used by a vehicle manufacturer to customize the user interface of the vehicle or by the vehicle owner to customize the operation and use of the vehicle (such as to preset seat and steering wheel positions for each authorized user).

In accordance with the teachings herein, the present invention provides a key-lock operated security system utilizing a fingerprint of an authorized user to control access to the security system. An intelligent key has a fingerprint scanner embedded in the surface thereof, and further has a microcontroller and electrical contacts, to provide an intelligent key capable of scanning and distinguishing between different fingerprints. The scanner is interfaced to the microcontroller which controls the operation thereof and reads data from the scanner. The arrangement scans and correlates the minutia patterns of an individual fingerprint against one or more patterns of fingerprints of one or more authorized users of the security system stored within a memory. A lock has electrical contacts which contact the electrical contacts on the intelligent key when the intelligent key is inserted therein, to provide electrical power to the scanner and the microcontroller of the key, and to enable a data signal to be transmitted from the intelligent key through the electrical contacts in the lock. A key-lock controller receives the data signal from the key, and in response thereto controls security functions of the security system.

In greater detail, the security system is installed in a motor vehicle to operate and control the ignition system, and the key-lock controller controls ignition switch functions of the motor vehicle. The lock comprises a rotating lock mechanism which generates logic signals to indicate the rotational position thereof. In a preferred embodiment the memory is physically located within the intelligent key.

The microcontroller codes user profile data to form the data signal which is transmitted to the key-lock controller, which then decodes the data signal. The key-lock controller includes a microcontroller for decoding the data signal, and transmits control signals to the vehicle ignition system to start and operate the motor vehicle.

An over-ride switch is provided connected to the key-lock controller, and is used to temporarily disable the security system, such as during valet parking or for mechanical repair of the motor vehicle.

Electrical contacts are positioned on opposite sides of the intelligent key to conduct electrical power to the key and also to communicate the data signal from the key when the key is inserted into the lock, and the scanner comprises a solid state scanner chip which is embedded into the surface of the handle of the intelligent key.

The handle of the intelligent key is ergonomically designed to encourage a user to properly locate and position his finger over the scanner by a raised ridge which partially surrounds the embedded scanner. The intelligent key also includes keyed cuts in one edge to operate mechanical tumblers of the lock, and can also include color-coded light emitting diodes as a user friendly interface for clarity of operation.

The memory stores a database which includes biometric data which is only used internally in the key and cannot be read out, and associated user profile identification data which is read from the database during a successful correlation operation. The memory can also store data on the fingerprint of an attempted unauthorized user for law enforcement purposes.

The security system can be an integral part of a general security system or computer control system of the motor vehicle.

In alternative embodiments, the security system can control and grant access to a secure area, or to a secure database.

A separate key programming system is located at a central programming location, and is used to initialize and change data stored in the memory. The separate programming system includes a microcontroller, a random access memory, a keyboard for input of alphanumeric data, a fingerprint scanner, a key receptacle for inserting an intelligent key to program, a power/data interface to interface with the key, and a temporary memory which stores user data during programming but is erased after programming of the intelligent key.

BRIEF DESCRIPTION OF THE DRAWINGS

The foregoing objects and advantages of the present invention for a fingerprint identification security system may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
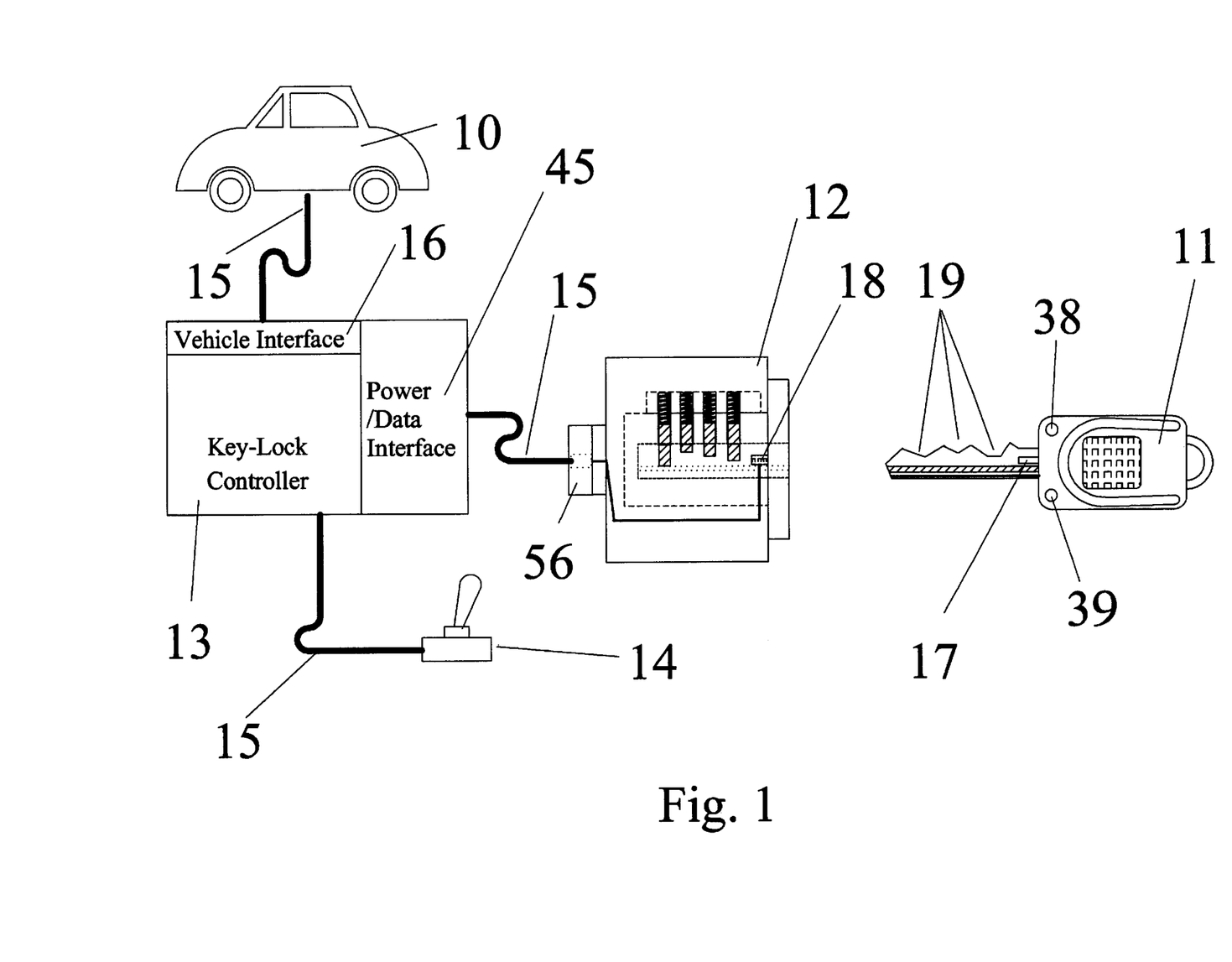
FIG. 1 illustrates a first embodiment of a security locking system pursuant to the present invention which comprises four main elements, an intelligent key, a rotating lock mechanism, a key-lock controller, and an over-ride switch.

Referring to the drawings in detail, FIG. 1 illustrates a key-lock operated intelligent security system utilizing a fingerprint of an individual to control access to a lock such as an automobile ignition switch. The intelligent security system is provided for a motor vehicle in the form of an automobile 10, and includes four main elements, an intelligent key 11, a rotating lock mechanism 12, a key-lock controller 13 which performs normal ignition switch functions in the automobile, and an over-ride switch 14, interconnected by cables 15.

In alternative embodiments, the motor vehicle could be any type of motor vehicle such as a truck, bus, motorcycle, boat, snowmobile, etc. Moreover, the security system of the present invention could be utilized in alternative embodiments to control and grant access to a secure area such as a building, room, vault, cabinet, safety deposit box, etc., or to control and grant access to a secure database or any other secure system wherein control and access concerns secure or secret matters.

The function of the intelligent key 11 is to scan and correlate the minutia patterns of an individual's fingerprint against one or more patterns of fingerprints previously stored within the key and then transmit a data profile of the use to the key-lock controller 13.

A suitable scanner device or chip for utilization in the intelligent key of the present invention is the scanner chip which is available commercially from Verdicom, Inc., 2338 Walsh Ave., Santa Clara, Calif. 95051, and which utilizes the technology described in U.S. Pat. No. 5,668,874 and also in U.S. Pat. No. 5,799,092, assigned to Lucent Technologies, Inc.

The intelligent key 11 includes all electronic components and functions necessary to scan a fingerprint, analyze and correlate the fingerprint data with data on one or more fingerprints previously stored in a memory therein, and to transmit an encoded signal based upon a successful correlation and match of that data to the key lock controller 13.

The intelligent key 11 may optionally contain color-coded indicating devices such as red and/or green light emitting diodes (LEDs) as a user friendly interface for clarity of operation.

When a user inserts the intelligent key 11 into the lock 12, power is provided to the key from the automobile battery through two or more electrical contacts 17 on the key (wherein one electrical contact might be ground) and matching electrical contacts 18 in the lock mechanism 12, thereby providing electrical power to and activating the electronic components of the intelligent key and starting the scanning operation. If the scanning operation results in a correlation match, an encoded data signal is transmitted from the key 11 through the set of electrical contacts 17–18, through the lock 12 to the key-lock controller 13, which then enables normal operation of the vehicle. If no correlation match is found, the vehicle is not enabled to function.

The functions of the lock 12 are: to provide power and data paths, via matching contacts 17–18, to enable the intelligent key 11 to operate and to communicate with the key-lock controller 13; to provide a usual mechanical locking action by keyed cuts 19 on the blade 33 of key 11 cooperating with matching mechanical tumblers in the lock 12; and also to generate logic signals to indicate the position of the lock mechanism to the key lock controller 13, as described in greater detail hereinbelow. The lock 12 requires a key to be inserted therein by a person with an authorized fingerprint and then rotated to one of several common positions, e.g. accessories on, ignition on, and start ignition. Rotation of the key may optionally be inhibited by an electromechanical release which is only activated by a successful fingerprint scan operation.

An attempt by an unauthorized user of the intelligent key will simply fail to activate any functions of the vehicle 10. Breaking the lock by force and attempting to rotate the ignition switch or short the wires together will also fail since a properly encoded data signal is required to be received by the key-lock controller 13 to enable proper operation of the automobile.

The function of the key-lock controller 13 is to decode the data signal from the key, and to enable normal control functions such as starting of the automobile. The normal functions of an ignition switch are performed by the key-lock controller 13 which is connected to the automobile by a vehicle interface 16 of the key-lock controller. The key-lock controller 13 is preferably placed in the vehicle in a location where it would be very difficult and time consuming for a criminal to bypass its intended operation.

While the subject invention described herein is independent of any existing system in the vehicle, it may optionally be designed to be part of a general security system or computer control system of the vehicle.

The over-ride switch 14 is connected to the key-lock controller 13, and is used to temporarily disable the system when necessary, such as during valet parking or for mechanical repair of the vehicle. The over-ride switch 14 may be activated only after an authorized user has operated the key 11. While deactivation of the over-ride switch 14 would normally be accomplished by an authorized user, some embodiments of the subject invention may enable the over-ride switch 14 to be deactivated by a programmed time-limit or number-of-key-operations-limit.

Figure 2:
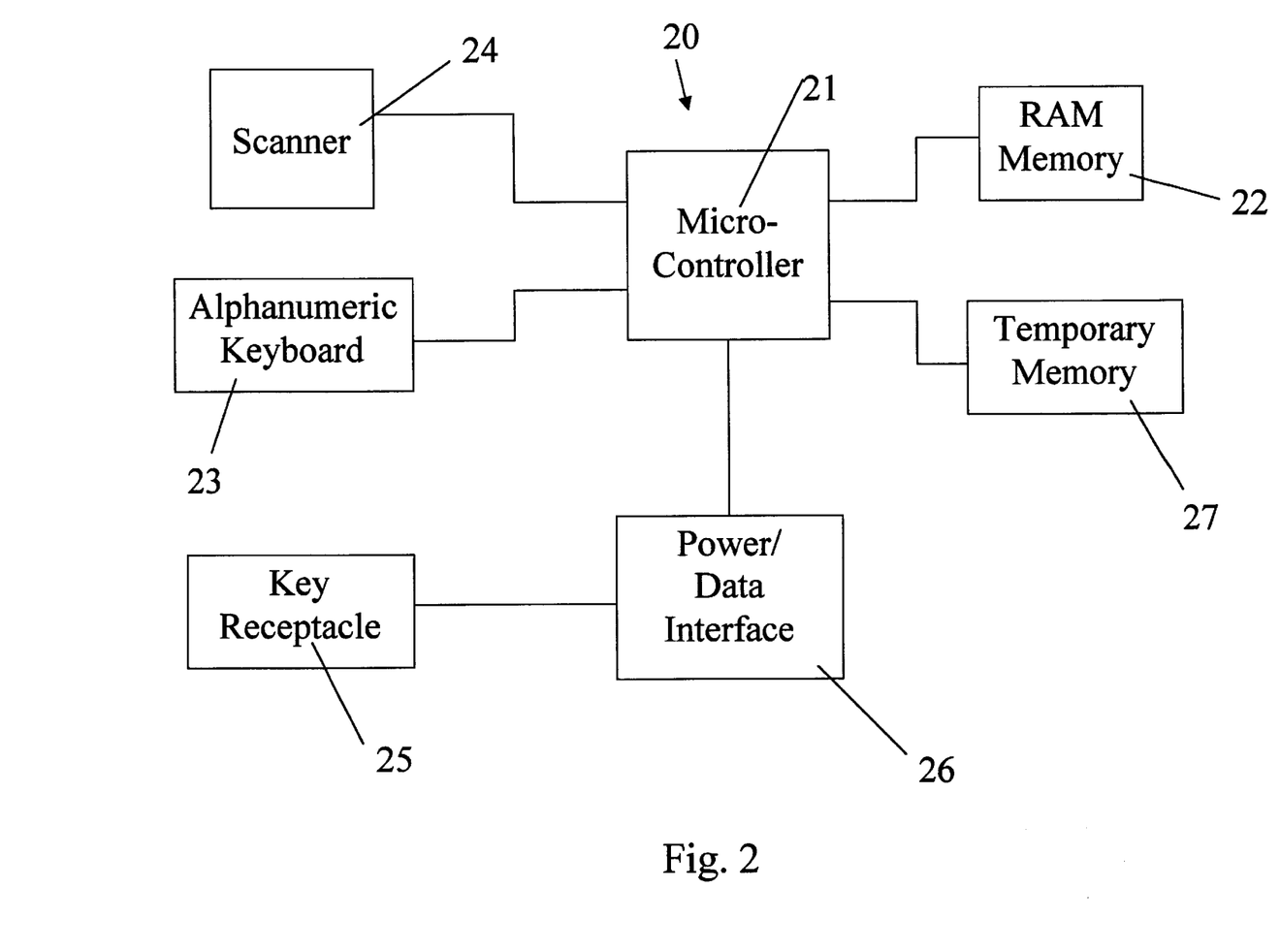
FIG. 2 is a functional block diagram of a separate key programming device which can be used to initialize data contained in the key or change the data as and when required.

FIG. 2 illustrates a separate key programming device or system 20 which is used to initialize data stored in the key or changes in the data as or when required. The programming device 20 is not required by the authorized vehicle user in everyday operation; therefore, it could be used at a central programming location such as by an automobile dealer, locksmith or key retailer. Security of the programming operation can be maintained through a combination of measures such as by controlled production and distribution of serially numbered programmers, a dealer or operator Personal Identification Number (PIN), a valid programmer fingerprint identification to enable operation of the key programming device 20, and the vehicle user fingerprint of previously programmed keys.

The key programmer 20 contains a microprocessor or microcontroller 21, a random access memory (RAM) 22, a keyboard 23 for input of alphanumeric data, a fingerprint scanner 24 for validating the programmer operator and for entering data on new authorized users of the intelligent key, a key receptacle 25 for inserting an intelligent key to program, a power/data interface 26 to interface with the key, and a temporary memory 27 which stores user data during programming but is erased after key programming.

The only fingerprint data which is maintained in the programmer 20 is the data for an authorized programming operator as long as it remains valid for a particular operator. The operator data can be changed only when additional factors are entered such as a PIN number, an authorized dealer PIN number, an authorized fingerprint of an authorized programming operator, etc.

Some embodiments of the present invention may include a portable programming device 20 to be used by the vehicle owner for limited programming of certain options available to the owner exclusive of making a new key, such as programming a new authorized user, or limiting authorized access to the automobile. For example, a parent might want to restrict the authorized hours of access that a child has access to the automobile. Other embodiments of the subject invention might include an input/output device permanently connected to the key-lock controller, such as on the dashboard, for the purpose of limited programming of certain options available to the owner exclusive of making a new key.

Figure 3:
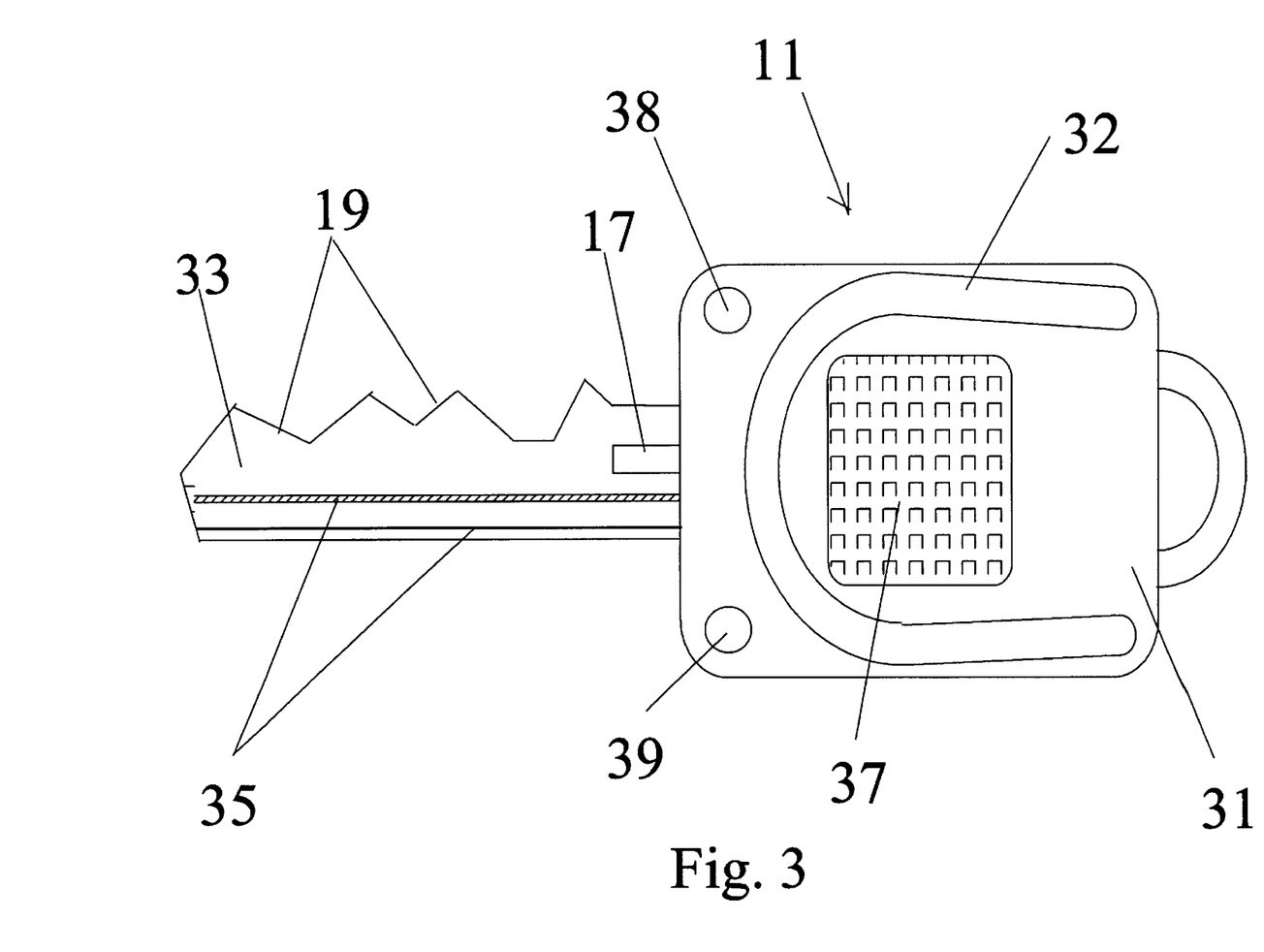
FIG. 3 illustrates the main mechanical features and functions of the intelligent key.

FIG. 3 illustrates the main features and functions of the intelligent key 11. The handle 31 of the key 11 contains a solid state scanner chip 37 such as the chip which is available commercially from Verdicom, Inc., 2338 Walsh Ave., Santa Clara, Calif. 95051, and which utilizes the technology disclosed in U.S. Pat. No. 5,668,784 and U.S. Pat. No. 5,799,092, and also other associated electronics components as described herein.

The handle 31 is ergonomically designed to force the user to properly locate and position his finger over the scanner by a raised ridge 32 which surrounds the scanning chip 37. The blade 33 of the key contains standard keyed cuts 19 in one edge to operate the mechanical tumblers of the lock 12. The blade of the key also includes asymmetrical grooves 35 to prevent a user from placing the key upside down in the lock. Two or more electrical contacts 17 are located on opposite sides of the blade 33 to conduct power to the key and also to communicate data from the key when it is inserted into the lock. The intelligent key 11 may optionally contain color-coded indicating devices, such as red and/or green light emitting diodes (LEDs) respectively 38,39, as a user friendly interface for clarity of operation.

Figure 4:
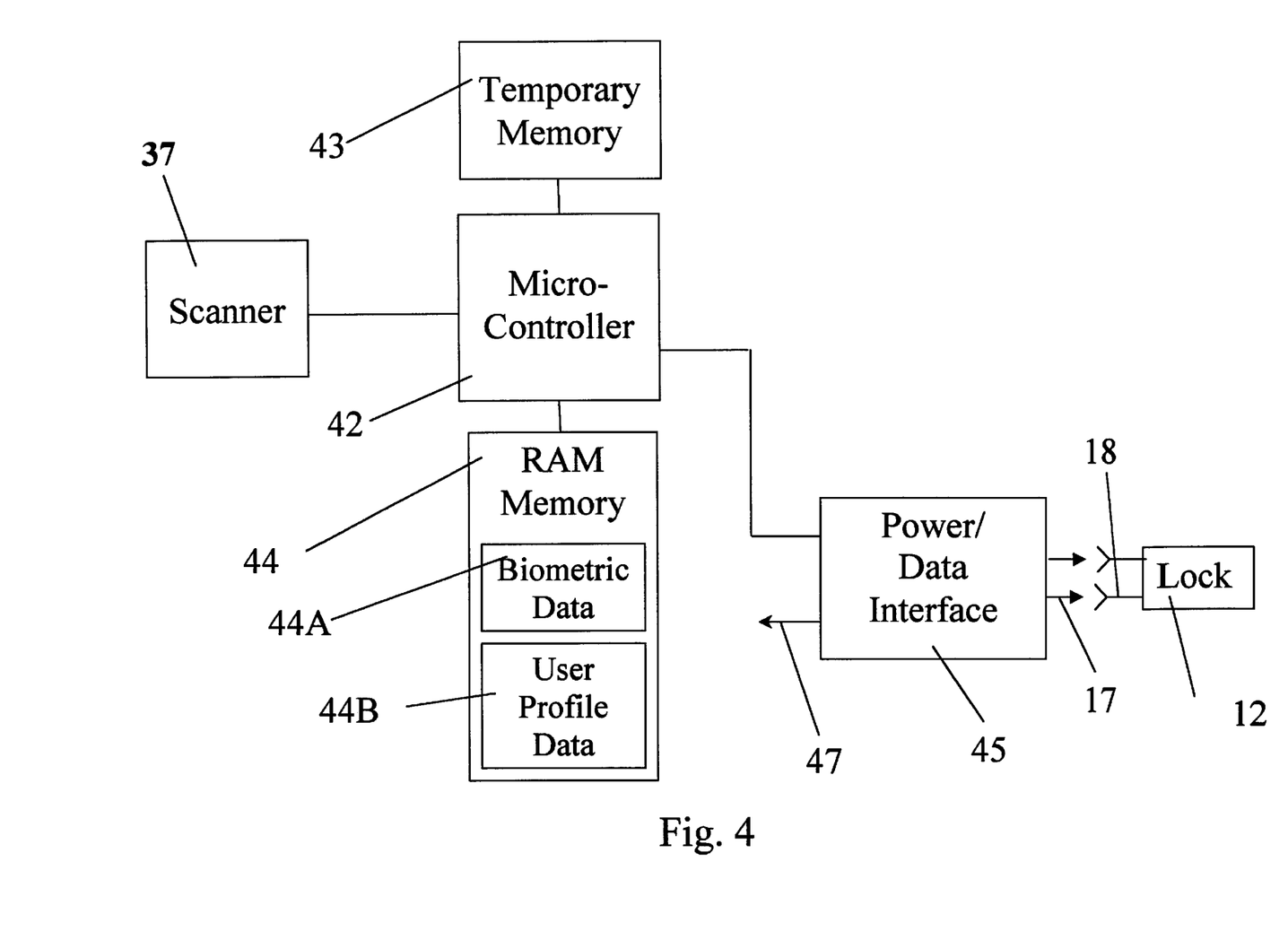
FIG. 4 represents a functional block diagram of the internal electronic components of the intelligent key.

FIG. 4 illustrates a functional block diagram of the internal electronic components of the intelligent key 11. The scanner chip 37 is interfaced to a microcontroller 42 which controls the operation of the scanner and reads data from the scanner into a temporary memory 43. The data in the temporary memory 43 is then correlated against data stored in an authorized user database in a RAM memory 44. The database includes biometric data 44A, such as data on fingerprints of authorized users, which is only used internally in the key and cannot be read out of the key, and associated user profile identification data 44B, such as data on each authorized individual user, e.g., user 1, user 2, etc., user preferences, restricted time access versus unrestricted time access to the automobile, etc., which is read from the key database during normal programming correlation operations. If a correlation match occurs, the user profile data is encoded or encrypted by the microcontroller 42, using common encoding or cryptographic techniques, and transmitted through a power/data interface 45 which is performed by the matching electrical contact sets 17–18. The function of the power/data interface is to separate power and data which share a common two-wire bus.

A preferred embodiment of the present invention processes data on fingerprints in the key to minimize the amount of data transmitted from the key to the key lock controller. Alternative embodiments might utilize the microcontroller in the key lock controller to process fingerprint data.

The present invention provides a distributed data processing system wherein the microcontroller in the intelligent key and the microcontroller in the key-lock controller share data processing functions. Alternative embodiments might differ on the precise data processing functions provided by each microcontroller.

When the key 11 is inserted into the lock 12, power for the key is available at lead 47 through the power/data interface 45 to enable operation of the intelligent key 11. The key 11 then begins scanning for a fingerprint of an authorized user while the user is gripping the key and starting to turn it in the lock. The identification process is fast enough to be transparent to the user.

Figure 5:
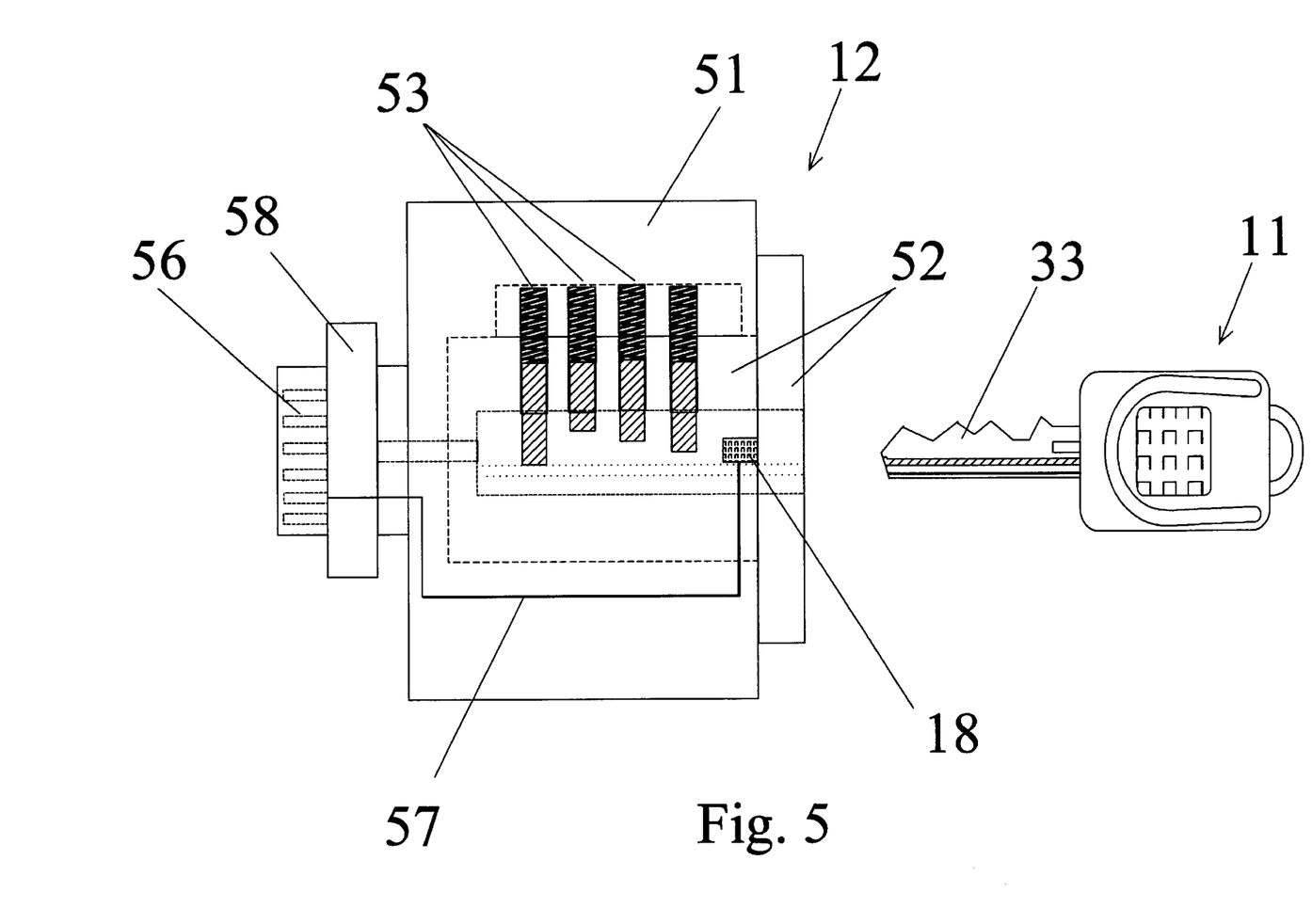
FIG. 5 illustrates the rotating lock mechanism.

FIG. 5 illustrates the rotating lock mechanism 12 which has a fixed housing 51 and a rotating tumbler mechanism 52. The lock 12 includes all of the standard features of a rotating lock with the addition of electrical contacts 18 for connection to the electrical contacts 17 of the key 11. A standard tumbler mechanism 52 comprises spring loaded pins 53 which, when properly aligned by the insertion of a matching key 11, allow rotation of the tumbler mechanism 52 by the inserted key, which rotates a switch 58 to provide logic signals to the key-lock controller 13 to indicate the rotational position of the tumbler mechanism 52. The electrical contacts 18 provide a connection between the electrical contacts 17 on the key 11 and a connector 56 on the lock assembly 12 through a power/data connection 57. The connector 56 provides the electrical connection to the key lock controller 13 as illustrated in FIG. 1.

An alternative embodiment might include an electromechanical locking solenoid to prevent rotation of the tumbler mechanism 52 until after a successful fingerprint correlation and match by the key 11.

Figure 6:
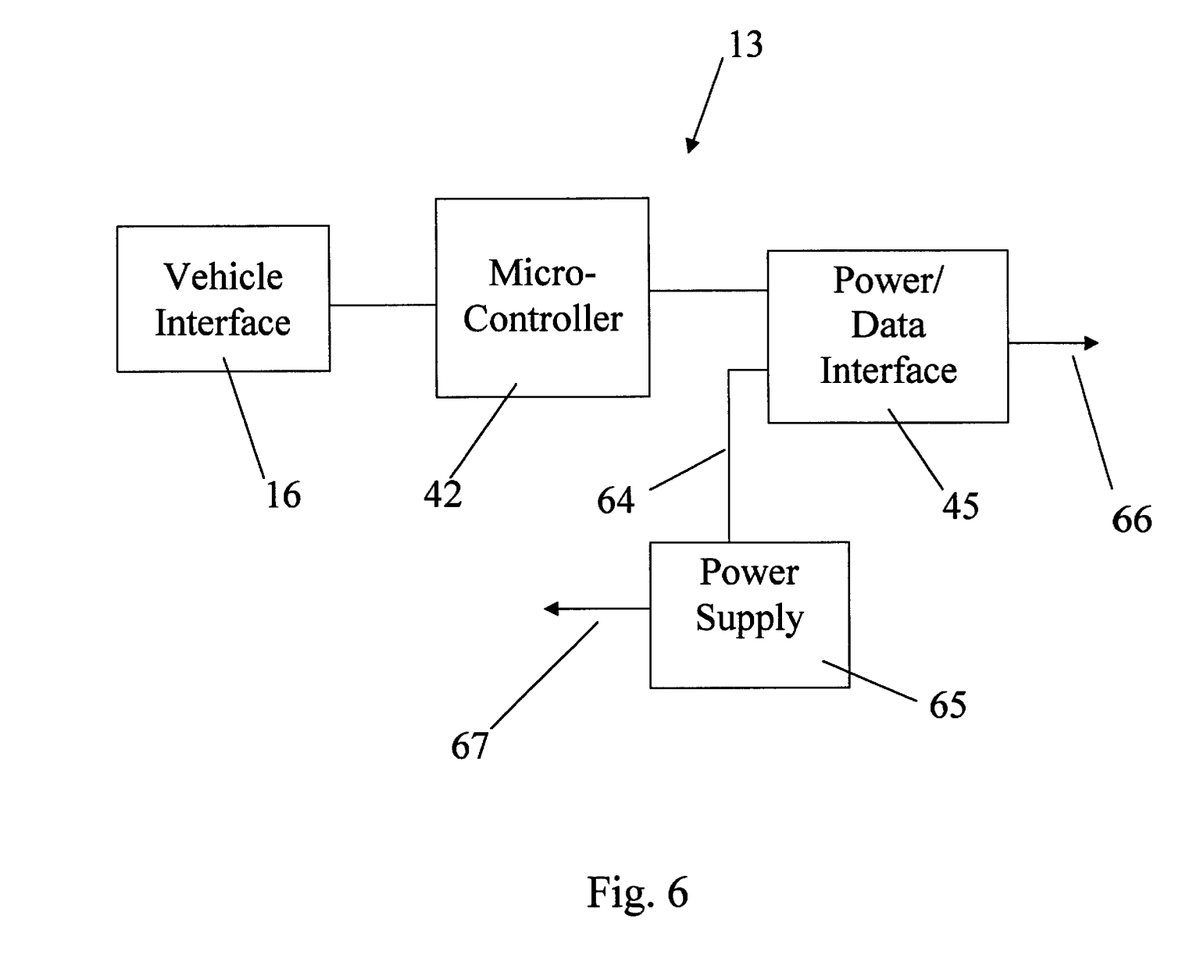
FIG. 6 is a functional block diagram of the internal electronic components of the key-lock controller.

FIG. 6 illustrates a functional block diagram of the internal electronic components of the key-lock controller 13. The key-lock controller 13 interfaces to the lock mechanism 12 through a power/data interface circuit 45, which connects to the key-lock 12 through a cable 15 to supply power from a power supply circuit 65 through the lock 12 to the key 11 and to return the encoded data signals to the microcontroller 42. The power supply 65 also supplies power at 67 to the key-lock controller 13. The microcontroller 42 decodes the data, validates the data by standard decoding or cryptographic techniques, and if the validation is successful, transmits the proper control signals to the vehicle ignition system to start and operate the vehicle through the vehicle interface 16, which could be implemented as electromechanical relays or solid state power control devices, i.e. transistors or silicon control rectifiers.

The vehicle interface 16 can be connected directly to the vehicle starting components, starting system, ignition system, etc., or through a vehicular computer controller or security system if built into the vehicle. The specific implementation would be particular to the vehicle manufacturer. An alternate embodiment could integrate the key-lock functions directly into the vehicular computer controller or security system built into the vehicle.

While several embodiments and variations of the present invention for a fingerprint identification security system are described in detail herein, it should be apparent that the disclosure and teachings of the present invention will suggest many alternative designs to those skilled in the art.

What is claimed is:

1. A key-lock operated security system utilizing a fingerprint of an authorized user to control access to the security system comprising:

a. an intelligent key comprising a mechanical key having an enlarged base end to be grasped between a thumb and forefinger of an authorized user and a narrow blade extending from the enlarged base end which can be inserted into and rotate a lock, said intelligent key having a fingerprint scanning means embedded in the surface thereof, and further having a microcontroller and a memory to provide an intelligent key for scanning and distinguishing between different fingerprints entirely within the intelligent key, wherein the scanning means is interfaced to the microcontroller which controls operation of the scanning means and reads data from the scanning means, to scan and correlate the minutia patterns of an individual fingerprint against one or more patterns of finger fingerprints of one or more authorized users of the security system stored within the memory, such that fingerprint recognition is performed entirely within the intelligent key, and the intelligent key having a data transmission means for transmitting encoded data signals indicating control functions in the security system;

b. said lock mechanically interfacing with the intelligent key when the intelligent key is inserted into the lock;

c. a key-lock controller for receiving and decoding the encoded signals from the intelligent key and in response thereto, controlling security functions of the security system.

2. A key-lock operated security system as claimed in claim 1, wherein the security system is installed in a motor vehicle to operate and control the ignition system of the motor vehicle, and the key-lock controller controls ignition switch functions of the motor vehicle.

3. A key-lock operated security system as claimed in claim 2, wherein the lock comprises a rotating lock mechanism.

4. A key-lock operated security system as claimed in claim 3, wherein the rotating lock mechanism generates logic signals to indicate the rotational position of the lock mechanism.

5. A key-lock operated security system as claimed in claim 2, further including an over-ride switch connected to the key-lock controller which is used to temporarily disable the security system such as during valet parking or for mechanical repair of the motor vehicle.

6. A key-lock operated security system as claimed in claim 2, wherein user profile data is coded by the microcontroller to form the data signal which is transmitted to the key-lock controller, which decodes the data signal.

7. A key-lock operated security system as claimed in claim 6, wherein the key-lock controller includes a microcontroller which decodes the data signal, and transmits control signals to the vehicle ignition system to start and operate the motor vehicle.

8. A key-lock operated security system as claimed in claim 1, wherein the security system controls and grants access to a secure database.

9. A key-lock operated security system as claimed in claim 1, wherein electrical contacts are positioned on opposite sides of the intelligent key to conduct electrical power to the key and also to communicate the data signal from the key, when the key is inserted into the lock.

10. A key-lock operated security system as claimed in claim 1, wherein the handle of the intelligent key is ergonomically designed to encourage a user to properly locate and position his finger over the scanning means embedded in the surface of the key by a raised ridge which partially surrounds the embedded scanning means.

11. A key-lock operated security system as claimed in claim 1, wherein the scanning means comprises a solid state scanner chip which is embedded into the surface of the handle of the intelligent key.

12. A key-lock operated security system as claimed in claim 1, wherein the intelligent key includes keyed cuts in one edge to operate mechanical tumblers of the lock.

13. A key-lock operated security system as claimed in claim 1, wherein the intelligent key includes color-coded light emitting diodes as a user friendly interface to prompt a user to correct action and for clarity of operation.

14. A key-lock operated security system as claimed in claims 1, wherein the memory stores a database which includes biometric data which is only used internally in the key and cannot be read out of the key, and associated user profile identification data which is read from the database during a successful correlation operation.

15. A key-lock operated security system as claimed in claim 1, wherein the intelligent key has electrical contacts, and the lock has electrical contacts which contact the electrical contacts on the intelligent key when the intelligent key and is inserted into the lock, to form the data transmitting means to enable the data signals to be transmitted from the intelligent key through the electrical contacts on the intelligent key and in the lock, and to provide electrical power to the scanning means, the microcontroller, and the memory of the intelligent key.

16. A key-lock operated security system as claimed in claim 15, wherein the intelligent key includes a power/data interface means, connected to the electrical contacts, for separating electrical power supplied to the intelligent key and communication data signals.

17. A key-lock operated security system as claimed in claim 15, wherein the key-lock controller includes a power/data interface means for separating electrical power supplied to the key-lock controller and communication data signals.

18. A key-lock operated security system as claimed in claim 1, wherein the memory also stores data on the fingerprint of an attempted unauthorized user for law enforcement purposes.

19. A key-lock operated security system as claimed in claim 1, further including a separate key programming system which is used to initialize and change data stored in the memory.

20. A key-lock operated security system as claimed in claim 19, wherein the separate programming system is located and used at a central programming location.

21. A key-lock operated security system as claimed in claim 19, wherein the separate programming system includes a microcontroller, a random access memory, a keyboard for input of alphanumeric data, a fingerprint scanner, a key receptacle for inserting an intelligent key to program, a power/data interface to interface with the key, and a temporary memory which stores user data during programming but is erased after programming of the intelligent key.

22. A key-lock operated security system as claimed in claim 1, wherein the security system is an integral part of a general security system or computer control system of the motor vehicle.

23. A key-lock operated security system as claimed in claim 1, wherein the security system controls and grants access to a secure area.

* * * * *